Nov. 21, 1961 E. A. LINDGREN 3,009,984

DOOR FOR A SHIELDED ENCLOSURE

Filed Aug. 7, 1958 2 Sheets-Sheet 1

INVENTOR.
ERIK A. LINDGREN
BY
Watson D. Harbaugh
Att'y

DOOR FOR A SHIELDED ENCLOSURE

Filed Aug. 7, 1958

INVENTOR.
ERIK A. LINDGREN
BY
[signature]
Att'y

United States Patent Office 3,009,984

Patented Nov. 21, 1961

3,009,984

DOOR FOR A SHIELDED ENCLOSURE

Erik A. Lindgren, 4119 N. Troy, Chicago, Ill.

Filed Aug. 7, 1958, Ser. No. 753,751
4 Claims. (Cl. 174—35)

This invention is concerned with shielded enclosures of the type commonly known as screen rooms, and more particularly is concerned with a door structure for such rooms.

This application constitutes a continuation-in-part of my co-pending patent application, Serial No. 496,284, filed March 23, 1955, now Patent No. 2,853,541.

The extensive increases in the use of electronic equipment has created problems of interference because of the proximity of one piece of equipment to another, and also because of the greater power developed by modern equipment. As a consequence thereof, it is often desirable or necessary to shield either the piece of equipment causing such interference or, alternatively, to shield the equipment affected thereby. Such shielding may be accomplished by enclosing the appropriate apparatus in a screen room.

Shielded enclosures or screen rooms comprise walled structures that define a completely closed compartment. The side, top and bottom walls are formed of material that affords a relatively high degree of penetration resistance to electromagnetic and electrostatic wave energy. In general, good electric conductive material, such as copper and bronze, satisfy this requirement and are therefore employed for this purpose. However, to reduce cost and to afford ventilation for the enclosure, copper or bronze mesh is frequently used rather than sheet stock. A further description of the general structural and functional characteristics of screen rooms is unnecessary, for these devices are now known in the art and are commercially available in various types, such as the single shielded, electrically insulated double shielded, and cell type shielded rooms, depending upon the precise disposition of the shielding materials.

In order for the shielding or attenuation characteristics of a screen room to be maximized, it is preferred that it be of the double shielded type and essential that the shielding laminations be electrically continuous. That is to say, the wire mesh screen material comprised by the side, top and bottom walls of the room must be electrically connected at all points therealong, and therefore any joints must be mechanically connected by solder or equivalent means from end to end thereof. This poses a problem with respect to the doors, which are a necessary part of such rooms since ready access must be provided to the interiors thereof, and it has been found that a large proportion of the electromagnetic and electrostatic leakage of such rooms occurs at the door joints. This problem in connection with the door structures is present with cell type rooms and somewhat magnified in double shielded rooms wherein inner and outer shielding layers or laminations are employed, which must be physically and electrically separated from each other except perhaps at one point therealong (generally where the power cable leads into the enclosure). The present invention is primarily concerned with this problem, and an object hereof is to provide an improved solution therefor.

Another object of the invention is in the provision of a sliding door arrangement for screen rooms and the like, so as to afford convenient access to the interior thereof, which obviates the space required for the operation of conventional swinging doors and minimizes leakage about the door joint.

Still another object is in the provision of a screen room of the character described, having a slidable closure door that defines a positive perimetric engagement thereabout with the stationary shielding laminations when the door is in the closed position.

A further object of the invention is to provide a double shielded screen room having inner and outer shielding laminations physically and electrically separated from each other about the access opening for the room, and to provide a double shielded sliding door for closing such access opening and which defines a positive connection thereabout between the respective inner and outer shielding laminations.

Still a further object is in the provision of a screen room and sliding door therefor having novel structural features that afford a degree of adjustability to insure positive connection respectively between the inner and outer shielding laminations of the door and of the room. Additional objects and advantages of the invention will become apparent as the specification develops.

An embodiment of the invention is illustrated in the accompanying drawings, in which.

Figure 1:
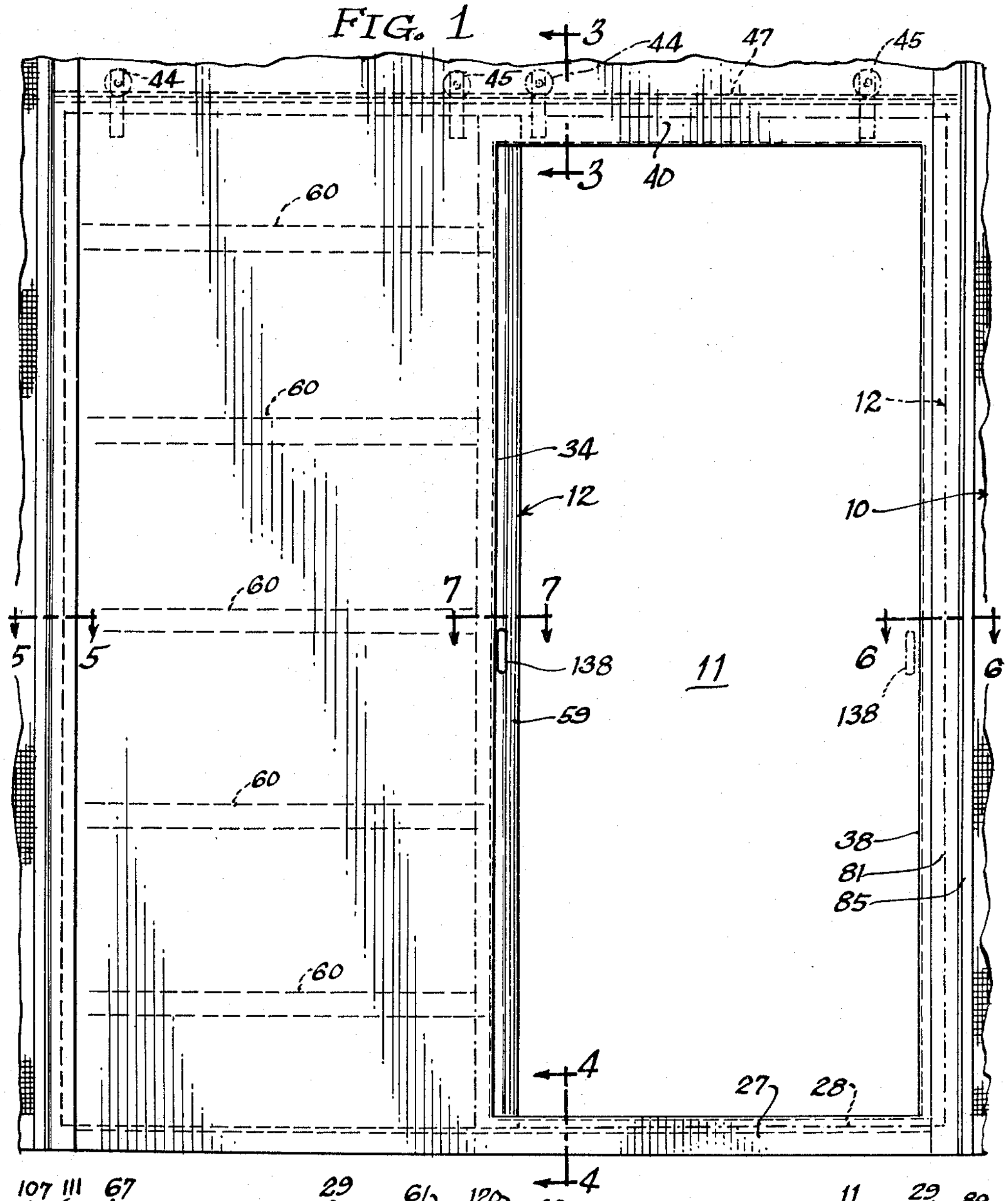
FIG. 1 is a broken side view in elevation of a screen room equipped with the sliding door, which is shown in the open position and with the closed position indicated.
Figure 2:
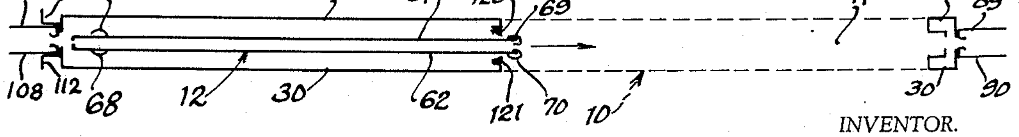
FIG. 2 is a diagrammatic view illustrating the interrelation of the sliding door with the wall panel receiving the same and electrical continuity across the access opening shown by solid lines.

FIG. 1 illustrates the wall portion of a screen room that provides the door-equipped opening therefor. Such wall of the screen room is denoted with the numeral 10, the opening therein with the numeral 11, and the door with the numeral 12. The door 12 is movable from the open position shown in FIG. 1 toward the right so as to completely close the opening 11. By referring to FIG. 4, it will be seen that the screen room is equipped with a floor which comprises a plurality of joists 13 that extend transversely thereof in spaced, parallel relation. Secured to the joists 13 are L-shaped brackets 14, and the anchorage thereof may be accomplished by screws 15. Supported on the upper edges of the joists 15 is flooring 16, which may comprise plywood panels and is preferably covered on the upper surface thereof with linoleum 17 or similar material.

Extending along the undersurface of the flooring 16 is an inner shielding layer or lamination 18 that may be copper or bronze screen, or sheet metal as shown. Similarly, an outer shielding lamination 19 extends along the lower edges of the joists 13, upwardly along the forward edges thereof and inwardly therefrom to form a lip 20 that extends along the edges of the stepped portion 21 of each of the joists. In a like manner, the inner shield 18 extends downwardly along the inset edges of the joist 13, and then forwardly therefrom to form a lip 22 that also lies along the stepped portions 21. The forward portions 21 of the joists support thereon a longitudinally extending beam 23 secured by a screw 24 to a lower inner guide wall member 25 and by a stud 26 to a lower outer guide wall member 27. It will be apparent that the guide wall members 25 and 27 are spaced apart by the beam 23, and define a channel 28 therebetween.

Substantially enclosing the lower inner guide wall member 25 is a portion of inner shield 29 having upwardly extending portions 29*a* and 29*b* which ensheath its vertical surfaces and a horizontally disposed portion 29*c* contiguous with the lip 22 of the shield 18 and in electrical contact therewith. The lower outer guide wall member 27 is similarly ensheathed by wall portions 30*a*, 30*b* and 30*c* of an outer shielding lamination 30. The wall portion 30*c* is in electrical contact with the lip 20 of the outer shield 19. It will be noted that a resilient pad 31 is interposed between the beam 23 and outer guide wall member 27 so as to define a cushion-like connection therebetween.

Figures 3, 4, 5, 6, 7, 8:
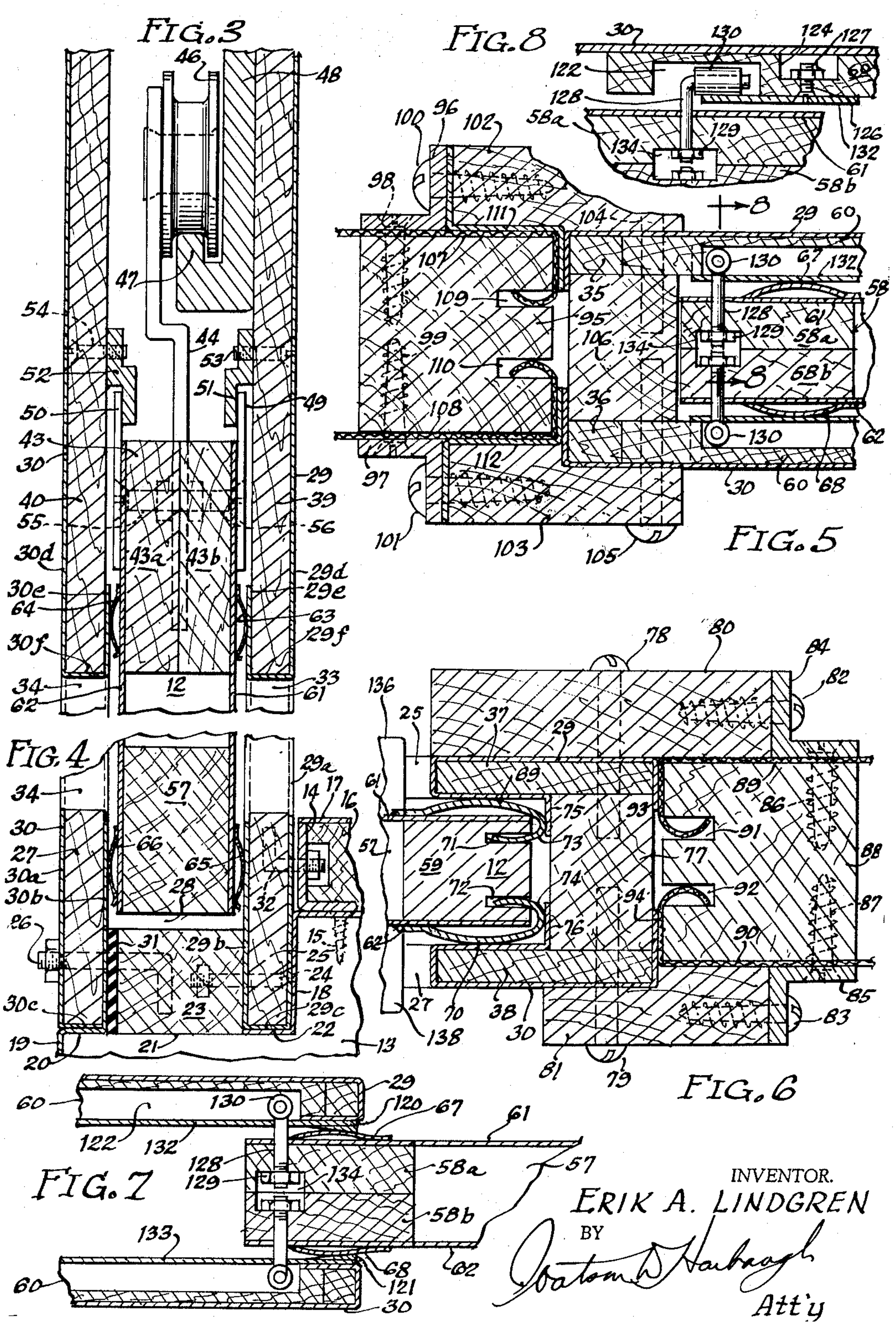
FIG. 3 is an enlarged, broken vertical sectional view taken along the line 3—3 of FIG. 1 with the door in closed position.
FIG. 4 is an enlarged, broken vertical sectional view taken along the line 4—4 of FIG. 1.
FIG. 5 is an enlarged, broken horizontal sectional view taken along the line 5—5 of FIG. 1.
FIG. 6 is an enlarged, broken horizontal sectional view generally similar to that of FIG. 5, but showing the opposite end portion of the sliding door when in the closed position thereof.
FIG. 7 is an enlarged, broken horizontal sectional view taken along the line 7—7 of FIG. 1 while the door is in the closed position.
FIG. 8 is an enlarged, broken vertical sectional view of the guide wall runner shown in FIGS. 5 and 7.

The structure comprised of the beam 23 and lower guide wall members 25 and 27 is secured to the joists 13 by studs 32 which are anchored in the lower inner guide wall member 25 and are secured to the brackets 14. Extending upwardly from the guide wall members 25 and 27 intermediate the ends thereof to partially define the access opening (FIG. 1) are frame or support walls 33 and 34 which have their outer surfaces thereof enclosed by continuations of the shield elements 29*a* and 30*a*. Similarly, at the ends of these guide wall members are corresponding frame components 35 and 36 (FIG. 5) and 37 and 38 (FIG. 6). All of such frame elements are connected to upper guide wall members 39 and 40 which are oriented, respectively, in parallel vertical alignment with the lower guide wall members 25 and 27. From FIGS. 1 and 3, it will be apparent that the upper inner guide wall member 39 is covered by shield 29 which at opening 11 has portions 29*e* and 29*f* turned inwardly over the bottom lamination edge thereof. And in a like manner, the upper outer guide wall member 40 is covered by portion 30*d*, 30*e* and 30*f* of outer shield lamination 30.

The door 12 in brief, is an internally braced frame structure covered by copper or bronze shielding and is disposed between the lower guide wall members 25 and 27 and upper guide wall members 39 and 40. More specifically, the door has an upper horizontally disposed frame member 43 built up by a lamination of two frame elements 43*a* and 43*b* that extend longitudinally of the upper guide wall members 39 and 40 and are interposed therebetween. Supporting the door in such position are hangers 44 and 45 sandwiched by the frame elements 43*a* and 43*b* equipped at the upper ends thereof with a sheave or roller 46 that rides on a rail 47 provided by a bracket 48 secured to the upper inner guide wall 39. Since the rail 47 extends longitudinally of the upper guide wall 39, it will be apparent that the door 12 is slidably movable longitudinally therealong by means of the handles 136 and 138. Such longitudinal movement of the door is stabilized by a guide assembly comprising plates 49 and 50 secured, respectively, to the vertical surfaces of the frame member 43 and guide brackets 51 and 52 secured, respectively, by screws 53 and 54 to the inner surfaces of the guide wall members 39 and 40. The lower portions of the guide brackets 51 and 52 are spaced from the inner surfaces of the guide walls, and the upper end portions of the guide plates 49 and 50 are interposed between the bracket therefor and guide wall that carries the same. The guide plates and hangers 44 and 45 are rigidly secured to the frame member 43 by screw assemblies 55 and 56 which, as is clear from FIG. 3, are offset from each other along the longitudinal axis of the frame member.

The door 12 is equipped with a lower frame member 57 extending along the bottom thereof between the lower guide wall members 25 and 27. Extending between the upper and lower frame members 43 and 57 and defining the vertical edges of the door (FIG. 1), are vertical frame members 58 and 59. It will be noted that the frame members of the door 12 defining its outer edges are secured to each other by any suitable means and reinforced by a plurality of braces (not shown). An inner shield 61 and an outer shield 62 extend, respectively, over the inner and outer surfaces of the door 12. Preferably, these shielding laminations are formed of copper or bronze metal sheet as shown in FIGS. 1, 3 and 4.

As stated hereinbefore, during the use of the room, with the door in closed position, it is necessary to establish an electrical connection between the outer shielding lamination 62 of the door and outer shield defined by the element 30 about the entire perimetric extent of the door. In a like manner, the inner shield lamination 61 should be electrically connected to the shield 29, and at the same time should be electrically isolated from the shield 62. Such an arrangement is accomplished by equipping the door along the upper frame members thereof with inner and outer contact fingers 63 and 64, and along the lower frame member with similar contact fingers 65 and 66. The contact fingers are preferably continuous metal strips, bowed outwardly, as shown in FIGS. 3 and 4, and soldered or otherwise electrically and mechanically connected to the inner and outer shielding laminations 61 and 62. Thus, the fingers or strips extend the entire width of the door, and resiliently engage throughout the lengths thereof the respective shielding elements 29 and 30.

Referring to FIG. 4, it is to be noted again that the lower outer guide wall member 27 and the spacing beam 23 are resiliently separated by a cushion 31 and that stud 26 provides adjustment for the vertical spacing therebetween. In this way adjustment of the pressure between the contact fingers 65 and 66 and the guide walls 25 and 27 is possible to insure good electrical contact, yet maintain binding between the contact fingers and the guide walls to a minimum.

With the door in closed position as seen in FIG. 7 good electrical contact between the shielding laminations 61 and 62 at the inner end of the door to the guide wall shielding laminations 29 and 30 is made by contact fingers 67 and 68 respectively which are electrically and mechanically connected to their respective shields 61 and 62 of the door and are similar in construction and function to the contact fingers 63 and 66. Metal contact wedges 120 and 121 are interposed between the shield laminations and the corresponding fingers which depress the fingers slightly to insure good electrical contact. In this connection it should be noted that the contact fingers 67 and 68 have a tendency to bow the vertical guide wall frame members 33 and 34 outwardly which could reduce the contact pressure significantly and cause poor electrical contact. This condition might well become more eminent with the contraction, expansion and warping of the members which occurs with the varying conditions in which the screen room is used. To prevent the undesirable warping of the frame members and ultimately of the guide wall itself a plurality of guide and runner assemblies are utilized. As seen in FIGS. 1, 5 and 7 guide members 60 extend horizontally in spaced relationship between the vertical guide wall frame members 30, 34 and 30, 36 so that they also offer some degree of rigidity to the guide wall structure. A groove 122 runs longitudinally substantially over the entire length of the guide member 60. Referring to FIGS. 5 and 7, a follower runs in the groove of the guide member, the follower comprising a roller journalled on an L-shaped pin 128 which is suitably mounted in the door 12 so that the roller is vertically disposed and free to rotate. It will be seen in the preferred embodiment as illustrated in FIGS. 5 and 7 that the roller assembly is mounted on the inner frame member 58 of the door. To achieve this end the inner frame member 58 is built up as a laminar structure of two frame elements 58*a* and 58*b* and one set of roller assemblies is embedded in the frame element 58*a* by the horizontal portion of the L-shaped pin extending to a recess 134. This extremity of the pin is threaded and a nut 129 is secured thereto and counter-sunk in the recess to hold the pin and roller in the desired position. It should be apparent that the same construction is followed in mounting roller assemblies in frame element 58*b*. A stop plate 132 which partially covers the groove 122 of the guide member 60 and extends along its entire length is suitably secured to the guide member by bolt 126 and nut 127 to provide a running surface for the roller as seen in FIG. 8. In operation the roller is free to roll within the groove of the guide member 60 as the door is moved along the rail 47; however, any tendency for the guide walls to warp outwardly from the desired spaced relationship with the door is prevented by the roller in contact with the stop plate of the guide member and good electrical contact is insured at all times. It is also significant in this connection that the stop plates 132 are electrically and mechanically connected to the shield laminations 29 and 30 of the guide walls and thus electrical continuity between these shields and the shield laminations 61 and 62 of the door is insured even when the door is not fully closed. As shown in FIG. 6, contact fingers 69 and 70 are disposed vertically along the outer edge of the door 12 and differ from the other contact fingers only in that the outer ends thereof are turned inwardly over the forward edge of the door and project into respective slots 71 and 72 formed in the door for that purpose. Thus the contact fingers described in connection with the roller and guide assemblies, define an electrical connection with the various inner and outer stationary shield elements about the entire periphery of the door when it is in closed position.

It will be further noted by referring to FIG. 6 that the turned or arcuate end portions 73 and 74 of the contact fingers 69 and 70 define stops or abutment elements that are engageable with the lips 75 and 76 provided by the shield laminations 29 and 30. These lips lie along the surface of a vertically extending post 77 which is secured to the frame members 37 and 38 by screws 78 and 79, that also extend through support panels 80 and 81 respectively. The support panels, in turn, are connected by screws 82 and 83 to L-shaped brackets 84 and 85, which in turn are anchored by screws 86 and 87 to a corner post 88 of the screen room. The corner post has inner and outer shielding laminations 89 and 90 extending therealong, which at their ends turn inwardly and terminate within recesses 91 and 92 provided therefor in the post. The shields 89 and 90 are formed of copper or bronze metal or screen as shown, and are in contact with inwardly extending flanges or lips 93 and 94 provided by the shields 29 and 30 so as to form electrical connections therewith.

Referring to FIG. 5, it will be seen that the screen room at the other forward corner thereof is provided with a post 95 having L-shaped brackets 96 and 97 secured thereto by screws 98 and 99, respectively; and such brackets in turn are anchored by screws 100 and 101 to vertically extending panels 102 and 103 which are fastened by screws 104 and 105, respectively, to the frame members 35 and 36, and in turn to a vertically extending post 106. The corner post 95 has screen shielding elements 107 and 108 extending along the surfaces thereof, which turn inwardly at their ends and terminate in recesses 109 and 110 provided therefor by the post. These screen shields are connected, respectively, to straps 111 and 112 that are locked therealong in that they are interposed between the corner post 95 and panels 102 and 103. The straps 111 and 112 adjacent the inner ends thereof extend laterally along the ends of the members 35 and 36, and then inwardly thereof along the facing surfaces of such members and consequently electrically connected with the shielding elements thereof.

Since the screen room is equipped with a sliding door, ready access to the interior thereof is provided for the door is easily moved between the open and closed positions thereof. At the same time, none of the valuable interior space in the screen room is used by a swinging door, and outside clearance need not be provided. Further, substantially no leakage occurs around the door joint for when the door is closed, it is automatically connected electrically about the entire periphery thereof with the respective inner and outer shield laminations of the room walls. The slight resiliency of the contact fingers which may be formed of copper or bronze compositions assures a good electrical connection between the various shielding elements, and accommodates wear or slight loosening of the room connections. It will be apparent that the corner assemblies of the room afford convenient construction thereof, and permit tailoring or adjustment of the various wall components so as to accommodate specific sliding doors.

While in the foregoing specification an embodiment of the invention has been set forth in considerable detail for purposes of making an ample disclosure thereof, it will be apparent to those skilled in the art that numerous changes may be made in those details without departing from the spirit and principles of the invention.

I claim:

1. In a door for screen rooms having an opening-equipped vertical wall, said vertical wall comprising a pair of vertically spaced guide walls extending therealong, said guide walls supporting electromagnetic shielding laminations having portions thereof extending along the inside facing surfaces thereof, means for supporting the door for longitudinal movement along said guide walls, inner and outer electromagnetic shielding elements covering said door on the inner and outer surfaces thereof, a plurality of elongated strips of electric conductive material bordering each marginal side edge of the door and extending substantially from side to side of said door adjacent the top and bottom thereof, said elongated strips defining contact finger portions electrically connected respectively to said inner and outer shielding elements, said finger portions and lamination portions resiliently engaging each other under pressure in sliding electrically contacting relationship, said door supporting means including a rail extending along said guide walls intermediate the same and a plurality of roller-equipped hangers riding along said rail and secured to said door to afford the aforesaid longitudinal movement thereof, and guide means in close proximity to said finger portions including elongated guide brackets extending longitudinally along the facing surfaces of said guide walls, and guide plates carried by said door cooperatively arranged with said guide brackets to stabilize longitudinal movement of said door with respect to said engagement between said fiinger portions and said lamination portions.

2. The combination called for in claim 1 in which said shielding laminations are electrically isolated from each other and said shielding elements are electrically isoated from each other.

3. In a door for screen rooms having an opening-equipped vertical wall, said vertical wall comprising a pair of vertically spaced guide walls extending therealong said guide walls supporting electromagnetic shielding laminations having portions thereof extending along the inside facing surfaces thereof, means for supporting the door for longitudinal movement along said guide walls, inner and outer electromagnetic sheilding elements covering said door on the inner and outer surfaces thereof, a plurality of elongated strips of electric conductive material bordering each marginal side edge of the door and extending substantially from side to side of said door adjacent the top and bottom thereof, said elongated strips defining contact finger portions electrically connected respectively to said inner and outer shielding elements, said finger portions and lamination portions resiliently engaging each other under pressure in sliding electrically contacting relationship, said door supporting means including a rail extending along said guide walls intermediate the same and a plurality of roller-equipped hangers riding along said rail and secured to said door to afford the aforesaid longitudinal movement thereof, spacer means secured between said guide walls including a beam member and a resilient pad interposed between said beam member and one of said guide walls to provide a cushion connection therebetween to maintain contact pressure between said finger portions and lamination portions.

4. In a door for screen rooms having an opening-equipped vertical wall, said vertical wall comprising a pair of vertically spaced guide walls extending therealong said guide wals supporting electromagnetic shielding laminations having portions thereof extending along the inside facing surfaces thereof, means for supporting the door for longitudinal movement along said guide walls, inner and outer electromagnetic shielding elements covering said door on the inner and outer surfaces thereof, a plurality of elongated strips of electric conductive material bordering each marginal side edge of the door and extending substantially from side to side of said door adjacent the top and bottom thereof, said elongated strips defining contact finger portions electrically connected respectively to said inner and outer shielding elements, said finger portions and lamination portions resiliently engaging each other under pressure in sliding electrically contacting relationship, said door supporting means including a rail extending along said quide walls intermediate the same and a plurality of roller-equipped hangers riding along said rail and secured to said door to afford the aforesaid longitudinal movement thereof, and guide means in close proximity to said finger portions including elongated guide brackets extending longitudinally along the facing surfaces of said guide walls and guide plates carried by said door cooperatively arranged with said guide brackets to stabilize longitudinal movement of said door with respect to said engagement between said finger portions and said lamination portions, spacer means secured between said guide walls including a beam member and a resilient pad interposed between said beam member and one of said guide walls to provide a cushion connection therebetween to maintain contact pressure between said finger portions and lamination portions.

References Cited in the file of this patent

UNITED STATES PATENTS

| | | |
|---|---|---|
| 1,997,420 | Kiekert | Apr. 9, 1935 |
| 2,765,362 | Lindgren | Oct. 2, 1956 |
| 2,838,592 | Feketics | June 10, 1958 |

OTHER REFERENCES

Publication: "ACE Shielded Enclosures," published by Ace Engineering and Machine Co., 3644 N. Lawrence Street, Philadelphia 40, Pa. (page 10 relied on).